(12) United States Patent
Young

(10) Patent No.: US 6,357,780 B1
(45) Date of Patent: Mar. 19, 2002

(54) ANTI-RATTLE TRAILER HITCH

(75) Inventor: David A. Young, Plymouth, MI (US)

(73) Assignee: Draw-Tite, Inc., Canton, MI (US)

( * ) Notice: Subject to any disclaimer, the term of this patent is extended or adjusted under 35 U.S.C. 154(b) by 0 days.

(21) Appl. No.: 09/551,794

(22) Filed: Apr. 18, 2000

Related U.S. Application Data

(60) Provisional application No. 60/133,079, filed on May 7, 1999.

(51) Int. Cl.$^7$ .................................................. B60D 1/00
(52) U.S. Cl. ....................... 280/506; 280/515; 224/448
(58) Field of Search ........................ 280/491.5, 495, 280/506, 511, 515; 224/506, 519, 521, 458, 448

(56) References Cited

U.S. PATENT DOCUMENTS

| | | | |
|---|---|---|---|
| 844,459 A | 2/1907 | McCausland | |
| 1,491,637 A | 4/1924 | Schrum | |
| 3,806,162 A | 4/1974 | Milner | |
| 3,837,679 A | * 9/1974 | Dickmann | 280/491 E |
| 4,490,065 A | 12/1984 | Ullrich et al. | |
| 4,720,233 A | 1/1988 | Meyer et al. | |
| 5,025,932 A | * 6/1991 | Jay | 211/20 |
| 5,169,042 A | * 12/1992 | Ching | 224/42.45 |
| 5,181,822 A | 1/1993 | Allsop et al. | |
| 5,344,175 A | 9/1994 | Speer | |
| 5,372,287 A | 12/1994 | Deguevara | |
| 5,449,101 A | 9/1995 | Van Dusen | |
| 5,469,998 A | 11/1995 | Van Dusen et al. | |
| 5,518,159 A | 5/1996 | DeGuevara | |
| 5,529,231 A | * 6/1996 | Burgess | 224/502 |
| 5,579,972 A | 12/1996 | Despain | |
| 5,593,172 A | 1/1997 | Breslin | |
| 5,615,904 A | 4/1997 | Van Dusen et al. | |
| 5,735,539 A | 4/1998 | Kravitz | |
| D408,261 S | 4/1999 | Gregory | |
| 5,988,667 A | * 11/1999 | Young | 280/506 |
| 6,010,143 A | * 1/2000 | Stein | 280/506 |
| 6,173,984 B1 | * 1/2001 | Kay | 280/495 |
| 6,186,531 B1 | * 2/2001 | Parent | 280/506 |
| 6,199,891 B1 | * 3/2001 | Bell et al. | 280/507 |

FOREIGN PATENT DOCUMENTS

| | | |
|---|---|---|
| DE | 2439330 A1 * | 2/1976 |
| DE | 2218711 * | 2/1979 |

OTHER PUBLICATIONS

Alpha Equipment Company, http://www.alphaequipment-company.com/index.html; 2001 catalog; hardware.*
Product card for an EZ–Lock J–Bolt.
Internet ad of a conventional J–Bolt sold by Alpha Equipment Company and the Fulton Lock; Jul. 18, 2000.

* cited by examiner

*Primary Examiner*—Brian L. Johnson
*Assistant Examiner*—Daniel Yeagley
(74) *Attorney, Agent, or Firm*—Carlson, Gaskey & Olds

(57) ABSTRACT

A hitch assembly generally includes a hitch receiver that retains an insert by a pin. The pin is preferably hook-shaped and includes a primary pin segment and an engagement terminus. The primary pin segment defines a primary axis transverse to the common longitudinal axis of the hitch assembly. When assembled, the primary segment passes through an aperture located in a first wall of the hitch receiver, the insert aperture of the insert and another aperture in the second wall of the hitch receiver. As a fastener is threadably engaged with a threaded portion of the pin, the fastener pulls the primary pin segment through the hitch receiver and drives the engagement terminus through the second aperture against the insert. The fastener thereby introduces tension in the pin to restrict movement of the insert relative to the hitch receiver and minimize free-play therebetween. In one embodiment, a tamper resistant secondary retainer provides a lock which engages a conical end of the pin.

21 Claims, 7 Drawing Sheets

ANTI-RATTLE TRAILER HITCH

BACKGROUND OF THE INVENTION

The present application claims priority to U.S. Provisional Patent application Ser. No. 60/133,079 filed May 7, 1999.

The present invention relates to a hitch receiver for a vehicle, and more particularly to a hitch receiver and pin that minimizes free play while still being useful with a broad range of common hitch inserts.

It is often desirable to carry or tow objects behind a vehicle. A common method of transporting such articles is by attaching the object to the vehicle using a receiver style hitch. Receiver style hitches mounted to a vehicle provide a strong connection and convenient use for such purposes as towing cargo and interconnecting the vehicle to carriers. Conventional receiver trailer hitches typically include a female receiver mounted to the vehicle which receives an insert having a corresponding shape such that the insert may be slid into the receiver. The receiver insert is removably attached to the receiver by a locking pin which passes through the receiver and the insert.

The fit between the two pieces must be loose enough to provide for their convenient engagement and disengagement, but tight enough to minimize vibration during transport or towing operations. These two competing objectives typically result in undesirable free play between the hitch receiver and the receiver insert.

An undesirable feature of prior art structures is the erratic movement caused by free play between the hitch receiver and the receiver insert. Such erratic motion may cause vibration and is undesirable.

Several approaches have been proposed to reduce vibration with receiver type trailer hitches. In one known approach, a separate clamp-like component is attached to the hitch receiver. A bolt in the clamp which does not pass through the hitch receiver, contacts the insert rearward of the receiver to apply pressure to the insert.

Another known approach provides an auxiliary securing pin that engages the inner surface of the tubular vehicle component. The receiver component includes two openings on opposing walls aligned at an angle oblique to the transverse and longitudinal axes of the vehicle and received components. After a portion of the received component is slid into the tubular vehicle component, a pin is rotated through the two openings in the received component to cause a tapered end of the pin to engage an inner corner surface of the tubular vehicle component. Tightening of the pin causes a corner of the received component within the tubular vehicle component to engage a corner of the vehicle component.

In yet another known approach, an insert includes coaxial apertures that are of a smaller diameter than apertures through the hitch receiver. A special bolt having a head that fits through the hitch receiver aperture but not fit through the insert aperture links the components together. As the bolt engages a nut on the opposite side of the hitch receiver the bolt head fits within the larger hitch receiver aperture and moves the insert to the side of the hitch receiver opposite the bolt head. Although able to relieve some free play, the necessary size differentiation of the bolt segments may not be suitable for highly loaded attachments. Further, the bolt must be specifically orientated in the transverse direction to assure that the bolt head properly contacts the hitch receiver which increases the difficulty of proper assembly and attachment.

While these approaches have attempted to solve the problem of hitch receiver vibration, they are complex in operation and structure, requiring multiple parts and complex tooling. These complexities add to the cost of manufacture and increase the potential for malfunction. Further, these proposals are not standardized so as to be useful with a broad range of common trailer hitch inserts and cannot, if necessary, be used with conventional pins.

SUMMARY OF THE INVENTION

The anti-rattle hitch assembly according to the present invention generally includes a hitch receiver that retains an insert by a pin. A particular benefit of the present invention is that the hitch assembly will accept common inserts, and no modification need be made thereto. The pin is inserted through an aperture in the insert and apertures through the hitch receiver when the insert is telescoped within the hitch receiver.

The pin includes a primary pin segment and an engagement terminus. Most preferably, the pin is hook shaped. The primary pin segment defines a primary axis transverse to the common longitudinal axis of the hitch assembly. When assembled, the primary segment passes through the aperture located in a first wall of the hitch receiver, the insert aperture and another aperture in the second wall of the hitch receiver. The pin is thereby loaded primarily in shear.

The pin is secured on the entering side by the engagement terminus which defines a secondary axis. The secondary axis is offset from the primary axis such that the engagement terminus passes through a second aperture in the first wall of the hitch receiver to exert a lateral force against the insert. As a fastener is threadably engaged with a threaded portion of the pin, the fastener pulls the primary pin segment through the hitch receiver and drives the engagement terminus through the second aperture against the insert. The engagement terminus continues to drive the insert toward the second wall of the hitch receiver until the insert contacts the inner face of the second wall. Further tightening of the fastener thereby introduces tension in the pin to restrict movement of the insert relative to the hitch receiver and minimize free-play therebetween. A more stable attachment is thus provided which reduces noise and impact forces.

The threaded end of the pin preferably includes a secondary retainer such as a through bore which receives a clip. The secondary retainer provides further assurance the pin cannot exit the hitch receiver should the fastener loosen. An alternate embodiment of the secondary retainer includes a padlock which is passed through the through bore to provide a tamper-resistant attachment. Another embodiment provides a conical end on an end of the pin to receive a lock which engages the conical end.

In another embodiment, the pin is manufactured from two pieces permanently attached together such as by welding. The primary segment is formed from a rod having a first diameter and the engagement terminus is formed from a rod having a second diameter. Another embodiment provides a pin manufactured from two pieces removably attached together. The primary segment includes a head that retains the engagement terminus which is rotationally retained on the primary segment by a slot and key engagement.

Yet another embodiment provides a support arm attached to the engagement terminus. The support arm rests against the hitch receiver when the pin is inserted through the hitch receiver to align the pin as the fastener is tightened.

Still another embodiment of the pin provides a double engagement terminus which preferably engages a retainer hitch having two secondary apertures. The two secondary apertures are offset from the primary pin segment and each pass through the hitch receiver to contact the insert. Additional force is thereby applied to drive the insert against the inner face of a hitch receiver wall.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
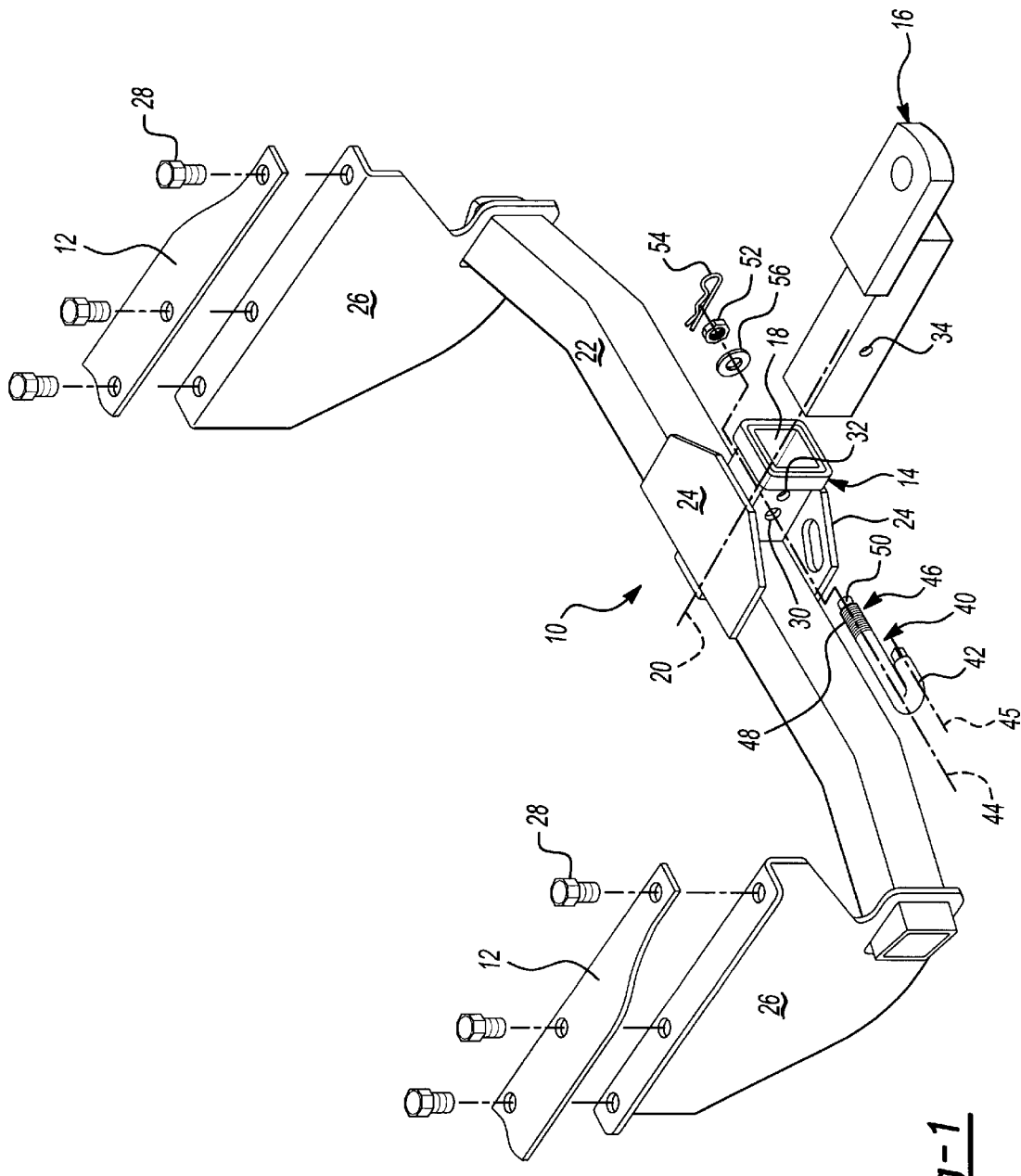
FIG. 1 is an exploded of a vehicle anti-rattle hitch assembly according to the present invention.

FIG. 1 illustrates an exploded view of a hitch assembly 10 for a vehicle (shown schematically at 12). The hitch 10 generally includes a hitch receiver 14 which receives an insert 16. A particular benefit of the present invention is that the hitch assembly 10 will accept common inserts, and no modification need be made to the insert. The insert 16 is typically attached to the cargo or carrier, but may also include a towing ball, or the like (not shown). Although a square hitch receiver 14 is illustrated, it should be realized that any shape cavity, such as rectangular, polygonal, round, oval, or the like can take advantage of the present invention. The insert 16 is sized to have exterior dimensions for mating engagement within the interior 18 of the hitch receiver 14 along a common longitudinal axis 20.

In the disclosed embodiment, the hitch receiver 14 is attached to a beam 22 and supported by brackets 24. Mounts 26 and fasteners such as bolts 28 mount the beam 22 to the vehicle 12. Although the beam 22 and mounts 26 are illustrated as separately attachable to the vehicle 12, the beam 22 can be an integral vehicle frame component. The specific attachment of the hitch receiver 14 to the vehicle 12 forms no part of the present invention and it should be understood that many hitch 10 to vehicle 12 arrangements will benefit from the present invention.

The hitch receiver 14 preferably includes a first aperture 30 and a second aperture 32 which extend through the hitch receiver 14 transverse to the longitudinal axis 20. As will be further described below, the second aperture 32 can extend through the hitch receiver 14 or only pass through one side thereof. The insert 16 includes an insert aperture 34, which corresponds to the first aperture 30, when the insert 16 is telescoped within the hitch receiver 14.

The hitch receiver 14 retains the insert 16 by a pin 40 which is inserted through the insert aperture 34 and the first aperture 30 when the insert 16 is telescoped within the hitch receiver 14. The pin 40 is secured on the entering side by an engagement terminus 42 displaced from a primary axis 44. The engagement terminus 42 defines a secondary axis 45 which is displaced from the primary axis 44 such that the engagement terminus 42 corresponds with the second aperture 32 to contact the insert 16. The engagement terminus 42 and second aperture 32 can be of an equivalent size to the first aperture 30 to simplify manufacture or of a different size to avoid confusion during use.

The opposite end 46 of the pin 40 preferably includes a threaded portion 48 and a through bore 50 for receipt of a fastener such as a nut 52 and a clip 54, respectively. It should be further understood that other fasteners which can be engaged without tools, such as a wing nut, knob, lever, cam-over-center, or the like may also be provided. A washer 56 may be further provided between the fastener 52 and the hitch receiver 14.

Figure 2:
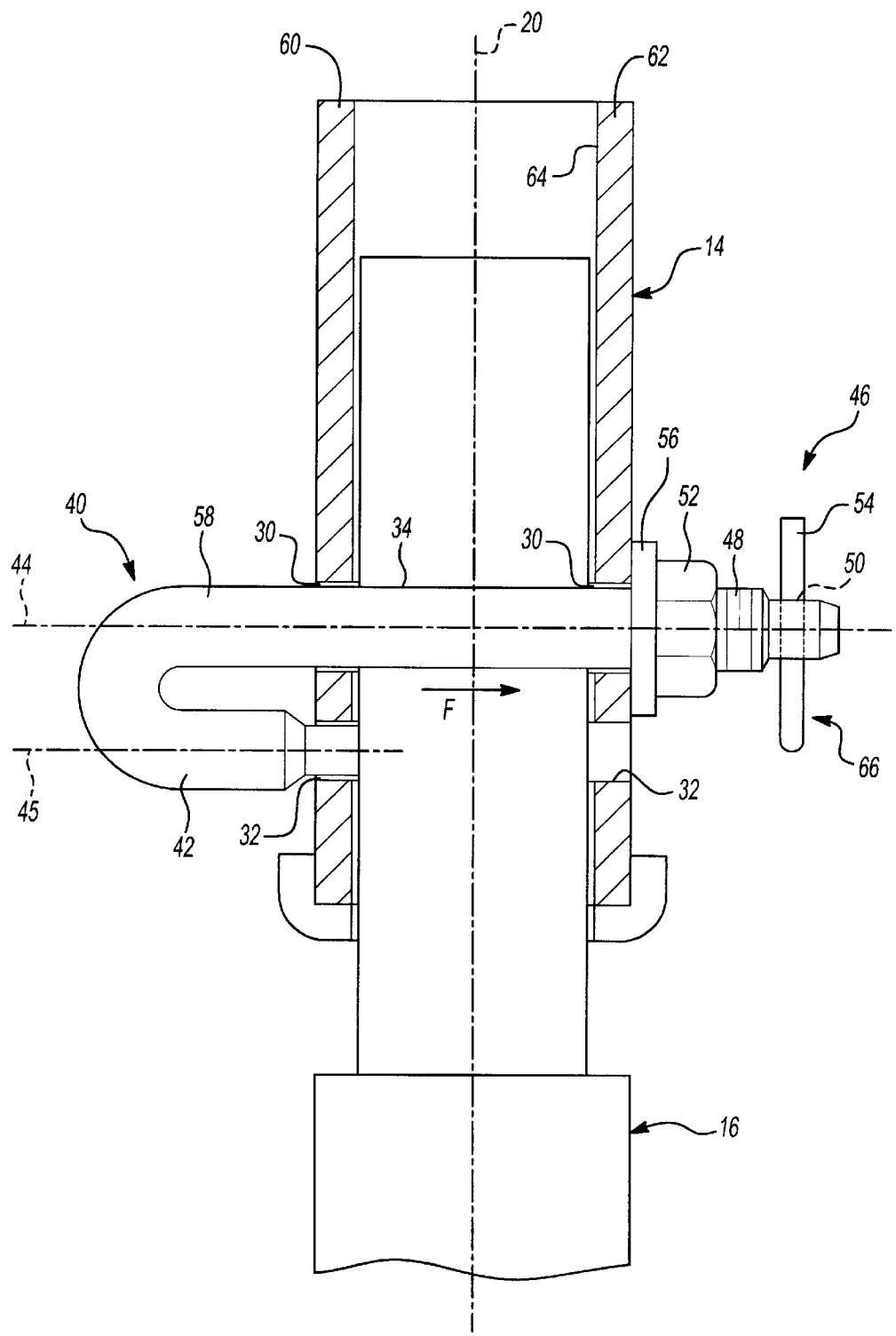
FIG. 2 is a sectional top view of the anti-rattle hitch assembly of FIG. 1.

Referring to FIG. 2, a sectional view through the hitch receiver 14 is illustrated. FIG. 2 illustrates the preferred hook pin 40 which retains the insert 16 within the hitch receiver 14 and minimizes relative free play. The pin 40 includes a primary pin segment 58 which defines primary axis 44. The primary pin segment 58 passes through the first aperture 30 located in a first wall 60 and a second wall 62 of the hitch receiver 14 substantially transverse to the common longitudinal axis 20. Between the first and second wall 60, 62, the primary pin segment 58 passes through the insert aperture 34 to retain the insert 16 within the hitch receiver 14. The pin 40 is thereby loaded primarily in shear.

The engagement terminus 42 defines the secondary axis 45. The secondary axis 45 is offset from the primary axis 44 such that the engagement terminus 42 passes through the second aperture 32 and contacts the insert 16. In the disclosed embodiment, the second aperture 32 extends through first wall 60 and the second wall 62 of the hitch receiver 14. By locating the second aperture 32 through both walls 60, 62 the pin 40 can be inserted from either wall, possibly simplifying manufacture and providing advantages with some inserts 16 and cargo. However, the second aperture 32 need not pass through both walls 60, 62.

When assembled, the primary pin segment 58 passes through the first aperture 30 located in the first wall 60, the insert 16 through the insert aperture 34, and the second wall 62 of the hitch receiver 14. The threaded portion 48 extends from the second wall 62 of the hitch receiver 14 to receive the fastener 52.

The engagement terminus 42 passes through the second aperture 32 and exerts a lateral force against the insert 16. As the fastener 52 is threadably engaged with the threaded portion 48 of the pin 40, the fastener 52 presses against the washer 56 and the hitch receiver 14 such that as the fastener 52 is further tightened, the engagement terminus 42 is driven against the insert in the direction of arrow F. The engagement terminus 42 continues to drive the insert 16 in the direction of arrow F until the insert 16 contacts the inner face 64 of the second wall 62. Further tightening of the fastener 52 thereby introduces tension in the pin 40 to restrict movement of the insert 16 relative to the hitch receiver 14 to minimize free-play therebetween. A more stable attachment is thus provided which reduces noise and impact forces commonly produced by the clearances in known devices.

Figure 3:
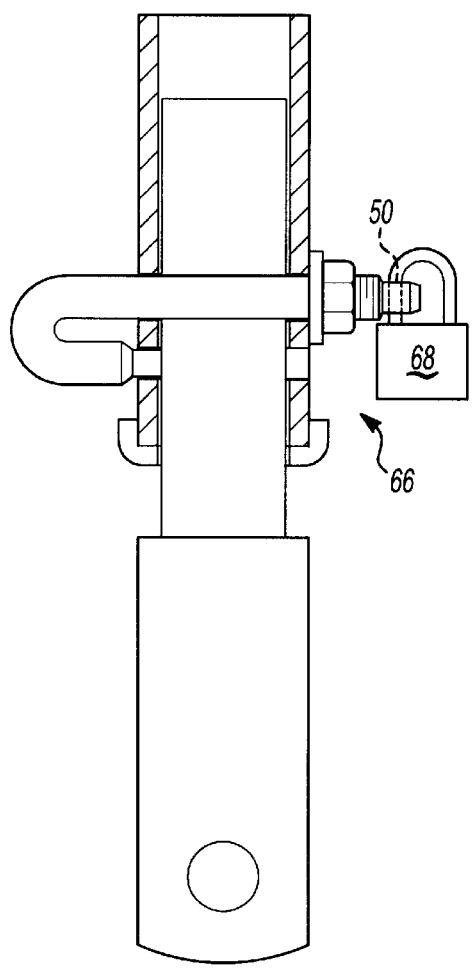
FIG. 3 is an alternate embodiment of the a secondary retainer for the anti-rattle hitch assembly of FIG. 2.
Figure 4:
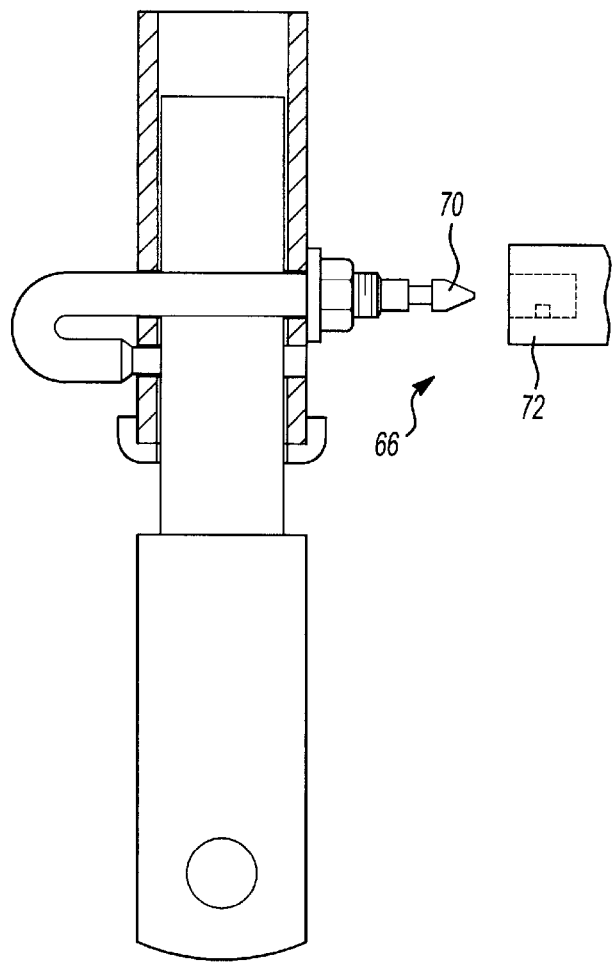
FIG. 4 is an alternate embodiment of the a secondary retainer for the anti-rattle hitch assembly of FIG. 2.

The opposite end 46 of the pin 40 preferably includes a secondary retainer 66 such as the through bore 50 which receives the clip 54. The secondary retainer 66 provides further assurance that should the fastener 52 loosen, the pin 40 cannot exit the hitch receiver 40. Even if the fastener loosens the pin 40 will still retain the insert 16 within the hitch receiver 14 as the pin 40 will still be loaded primarily in sheer. In an embodiment shown in FIG. 3, the secondary retainer 66 includes a padlock 68 which is passed through the through bore 50 to provide a tamper-resistant attachment. An alternate embodiment of a tamper resistant secondary retainer 66 is illustrated in FIG. 4. The secondary retainer 66 of FIG. 4, provides a conical end 70 on an end of the pin 40 to receive a lock 72 which is engagable by insertion onto the conical end 70. Such locks are known. It is the application which is inventive here.

Figure 5:
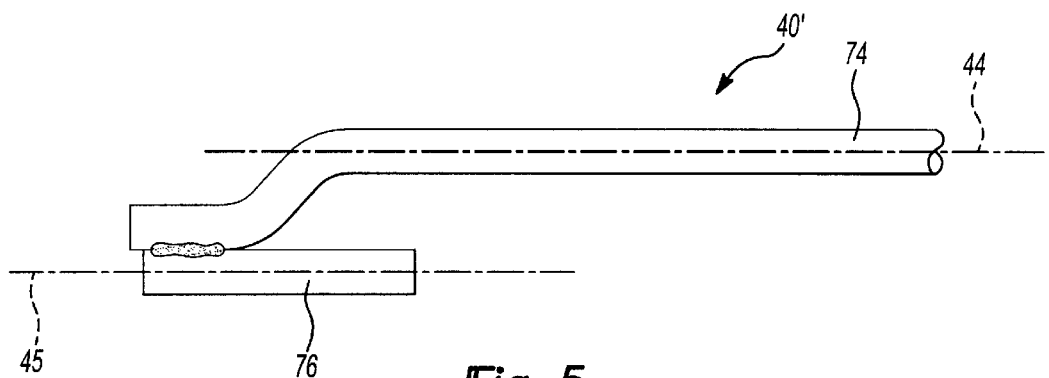
FIG. 5 is an alternate embodiment of an inventive pin for the anti-rattle hitch assembly according to the present invention.

Referring to FIG. 5, an alternate embodiment of the pin 40' is presented. The pin 40' is manufactured from two pieces permanently attached together such as by welding. The primary segment 74 is formed from a rod having a first diameter and the engagement terminus 76 is formed from a rod having a second diameter which defines the secondary axis 45. The secondary axis 45 is offset from the primary axis 44 such that the engagement terminus 76 passes through the second aperture 32 and contacts the insert 16. The different rod diameters correspond to the first aperture 30 and second aperture 32 (FIG. 2) as described above, however, the rods can be of equivalent diameter. Although members having a circular cross-section are illustrated, it should be realized that other shapes may also be provided.

Figure 6:
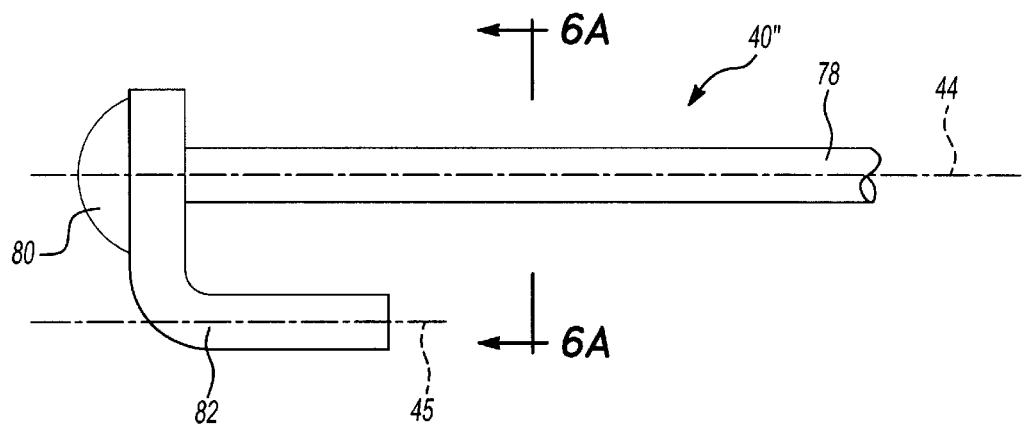
FIG. 6 is an alternate embodiment of an inventive pin for the anti-rattle hitch assembly according to the present invention.
Figure 6A:
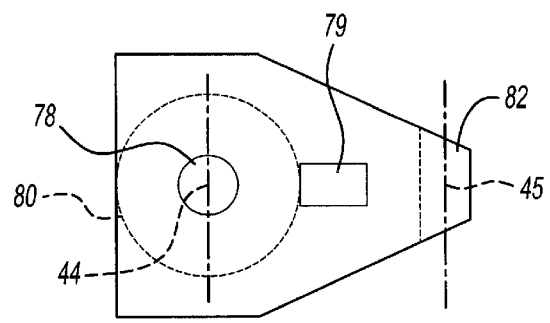
FIG. 6A is a sectional view of the engagement terminus of the inventive pin taken along line 6A—6A of FIG. 6.

Referring to FIG. 6, another embodiment of the pin 40" is presented. The pin 40" is manufactured from two pieces removably attached together. The primary segment 78 includes a head 80 that retains a separate plate-like engagement terminus 82 which defines the secondary axis 45. The secondary axis 45 is offset from the primary axis 44 such that the engagement terminus 82 passes through the second aperture 32 and contacts the insert 16 (FIG. 2). Referring to FIG. 6A, the engagement terminus 82 can be rotationally retained on the primary segment 78 by a slot and key engagement 79 that prevents rotation of the engagement terminus 82 relative to the primary segment 78.

Figure 6B:
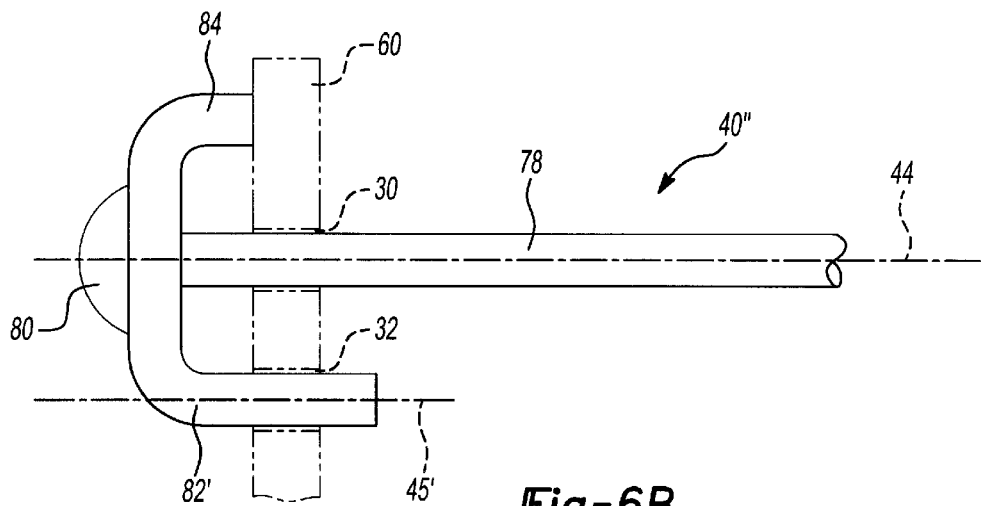
FIG. 6B is an alternate embodiment of an engagement terminus of the inventive pin of FIG. 6.

Referring to FIG. 6B, an alternate embodiment of the engagement terminus 82' is illustrated. The pin 40" includes a support arm 84 attached to the engagement terminus 82' which defines the secondary axis 45. The secondary axis 45 is offset from the primary axis 44 such that the engagement terminus 82' passes through the second aperture 32 and contacts the insert 16 (FIG. 2). The support arm 84 rests against the hitch receiver 14 (FIG. 2) when the pin 40" is inserted to balance the pin 40" as the fastener 52 is tightened.

Figure 7:
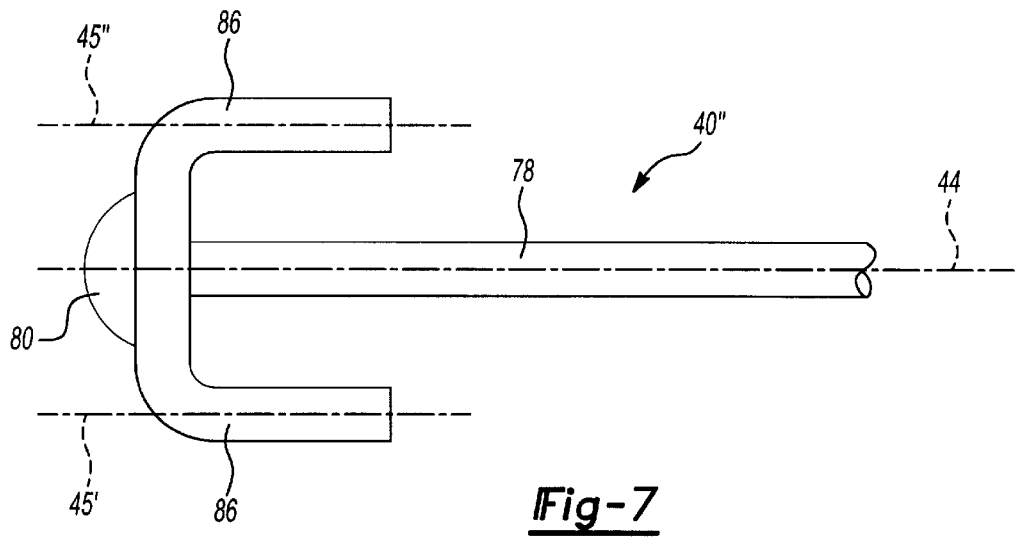
FIG. 7 is an alternate embodiment of an inventive pin for the anti-rattle hitch assembly according to the present invention.

Referring to FIG. 7, yet another embodiment of the pin 40" is presented. The pin 40" is manufactured from two pieces attached together. The primary segment 78 includes a head 80 that retains a double engagement terminus 86. The double engagement terminus 86 defines a secondary axis 45' and a tertiary axis 45". Although the disclosed embodiment illustrates that each axis 45', 45" is equivalently displaced from the primary segment 78, it should be realized that other displacements and relationships between each axis are contemplated by the present invention. Again, the double engagement terminus 86 can be fixedly attached to the primary segment 78, or can be removably attached thereto with a key-like engagement (FIG. 6A) or the like.

Figure 8:
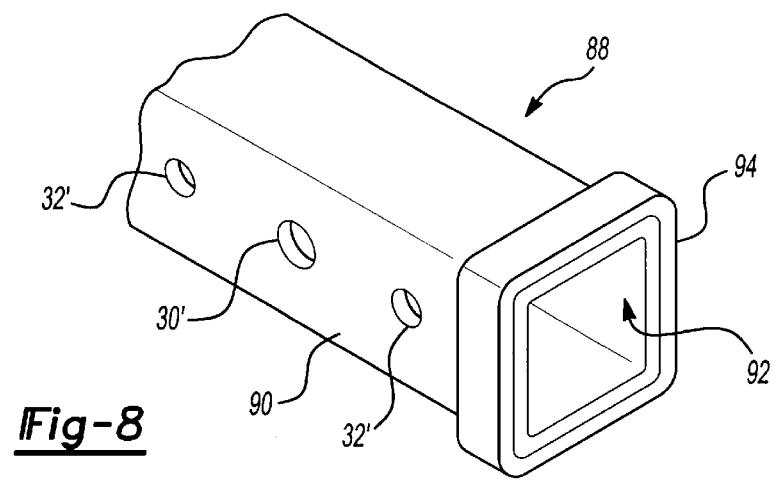
FIG. 8 is an alternate embodiment of a hitch receiver for an anti-rattle hitch assembly according to the present invention.

The double engagement terminus 86 preferably engages with a retainer hitch 88 having two secondary apertures 32' (FIG. 8). The secondary axis 45' and the tertiary axis 45" are both displaced from the primary segment 78 which defines the primary axis 44. Each prong of the double engagement terminus 86 pass through one of the secondary apertures 32' in the first wall 90 of the hitch receiver 88 to contact the insert 16 (FIG. 2). Additional force is thereby applied to drive the insert 16 against the inner face 92 of the second hitch receiver wall 94 (FIG. 8).

Referring to FIG. 8, the two secondary apertures 32' are illustrated as passing through the first wall 90 of the hitch receiver 88, and the first aperture passes through both walls 90,94, however, the second apertures 32' could also pass through both walls 90,94 as described above.

Figure 9:
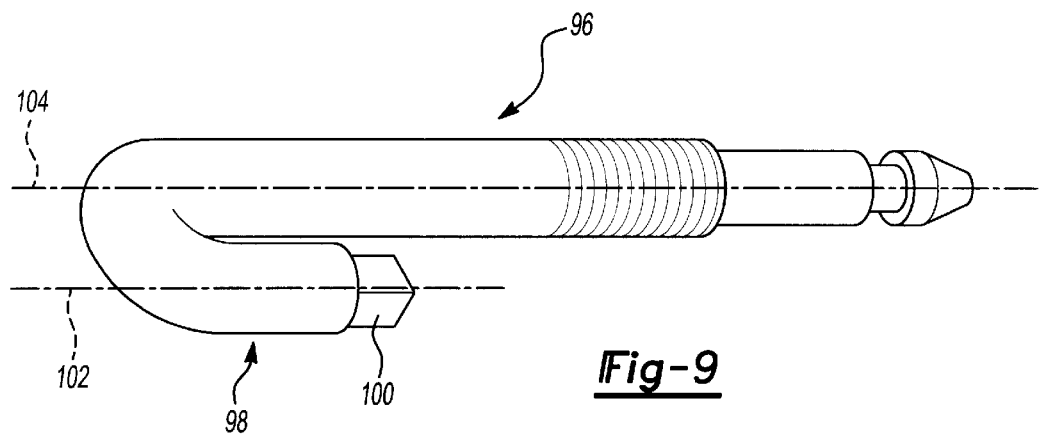
FIG. 9 is an alternate embodiment of an inventive pin for the anti-rattle, hitch assembly according to the present invention.
Figure 12:
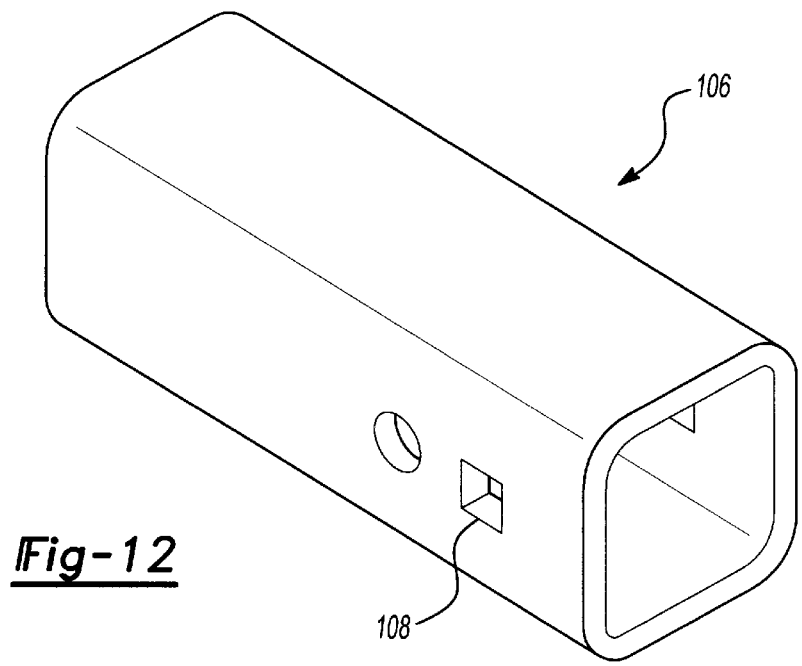
FIG. 12 is an alternate embodiment of a hitch receiver for an anti-rattle hitch assembly according to the present invention.

Referring to FIG. 9, yet another embodiment of the pin 96 is presented. The pin 96 includes an engagement terminus 98 having a squared end 100. The engagement terminus 98 defines a secondary axis 102 displaced from the primary axis 104. The squared end 100 preferably indexes with a receiver hitch 106 (FIG. 12) having a complementary secondary aperture 108.

Figure 10:
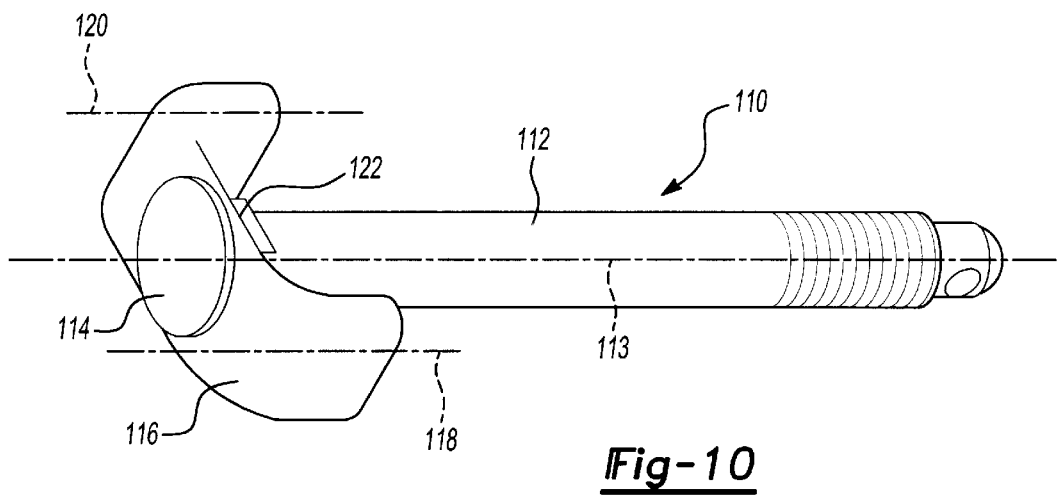
FIG. 10 is an alternate embodiment of an inventive pin for the anti-rattle hitch assembly according to the present invention.

Referring to FIG. 10, yet another embodiment of the pin 110 is presented. The pin 110 is manufactured from two pieces attached together. The primary segment 112 includes a head 114 that retains a support engagement terminus 116. The support engagement terminus 116 defines a secondary axis 118 and a tertiary axis 120. Although the disclosed embodiment illustrates that each axis 118, 120 is equivalently displaced from the primary segment 112 and primary axis 113, it should be realized that other displacements and relationships between each axis are contemplated by the present invention. Again, the support engagement terminus 116 can be fixedly attached to the primary segment 112, or can be removably attached thereto such as the disclosed square shaped key-like engagement 122 or the like.

Figure 11:
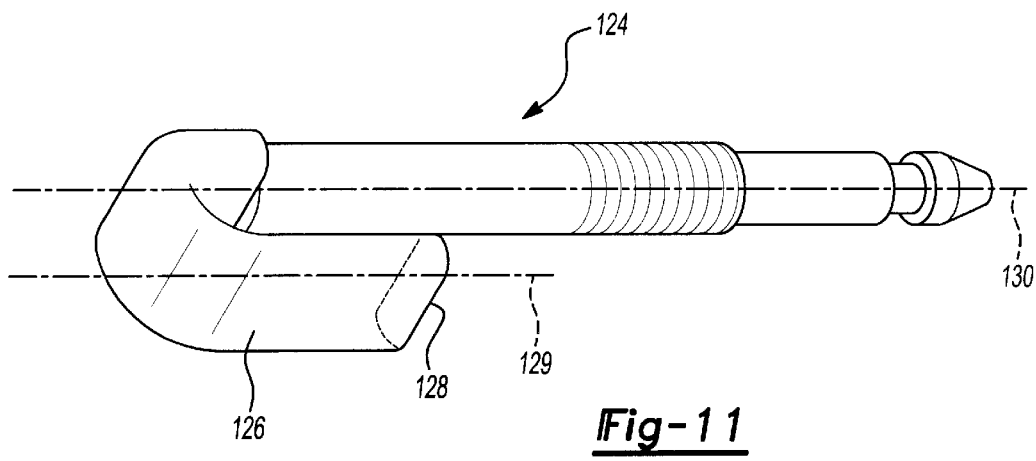
FIG. 11 is an alternate embodiment of an inventive pin for the anti-rattle hitch assembly according to the present invention.

Referring to FIG. 11, yet another embodiment of the pin 124 is presented. The pin 124 includes an engagement terminus 126 having an elongated end 128. The engagement terminus 126 defines a secondary axis 129 displaced from the primary axis 130. The elongated end 128 preferably indexes with a receiver hitch 134 (FIG. 13) having a complementary elongated secondary aperture 136.

Figure 13:
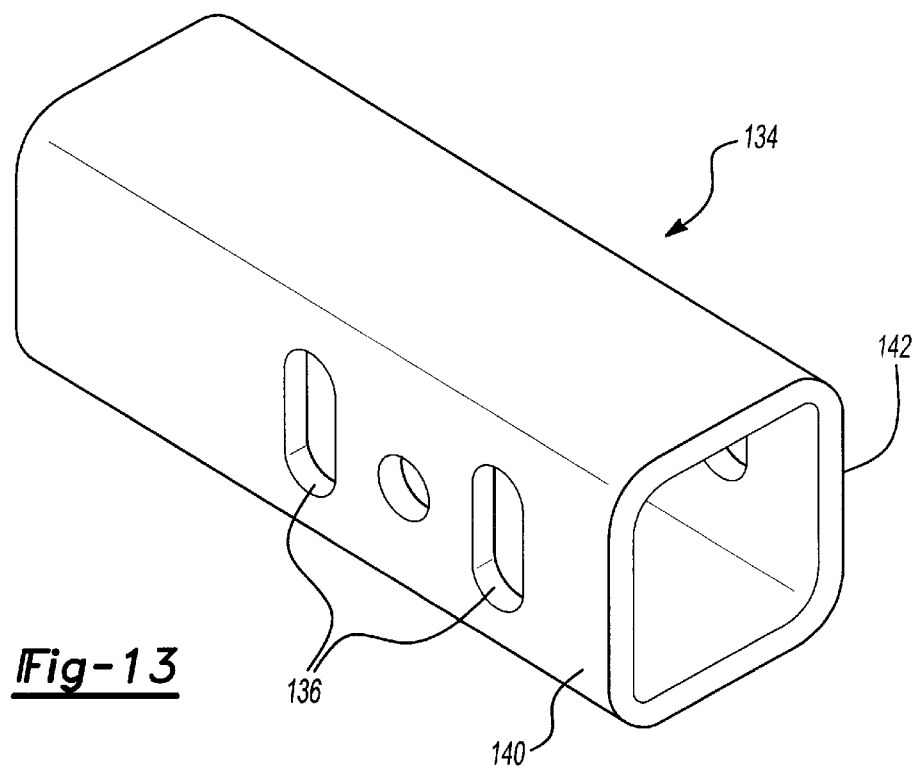
FIG. 13 is an alternate embodiment of a hitch receiver for an anti-rattle hitch assembly according to the present invention.

Referring to FIG. 13, two elongated secondary apertures 136 are illustrated as passing through both walls 140,142, of the receiver hitch 134, however, the elongated second apertures 136 could also pass only through the first wall 140 as described above. Although an elongated end is illustrated in the disclosed embodiment of FIG. 13, and square end 100 is illustrated in the disclosed embodiment of FIG. 9, it will be realized that any shape or size end, such as rectangular, polygonal, round, oval, or the like can take advantage of the present invention. In conjunction therewith complementary aperture(s) will be included in the receiver hitch.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A hitch pin assembly comprising:

a hitch pin having a primary segment defining a primary axis and an engagement terminus defining a secondary axis displaced from said primary axis, said primary axis and said second axis located in a substantially parallel relationship to be received through a first hitch receiver wall having a first and a second aperture horizontally disposed along a longitudinal axis substancially perpendicular to said longitudinal axis; and a threaded fastener receivable upon a threaded portion of said pin adjacent to a second hitch receiver wall substantially parallel to said first hitch receiver wall, said primary segment passing through said first aperture and an opposed aperture formed along said primary axis in said second hitch receiver wall, said engagement terminus drivable along said second axis through second aperture toward said threaded fastener to force an insert against an inner surface of said second hitch receiver wall in response to further engagement of said threaded fastener with said threaded portion and an outer surface of said second hitch receiver wall.

2. A hitch pin assembly comprising:

a hitch pin having a primary segment defining a primary axis and an engagement terminus defining a secondary axis displaced from said primary axis, said primary axis and said second axis located in a substantially parallel relationship to be received through a first hitch receiver wall having a first and a second aperture horizontally disposed along a longitudinal axis substantially perpendicular to said longitudinal axis and an insert having a first and second aperture of an equivalent diameter horizontally disposed along said longitudinal axis; and a threaded fastener receivable upon a threaded portion of said pin adjacent to a second hitch receiver wall substantially parallel to said first hitch receiver wall, said primary segment passing through said first aperture and an opposed aperture formed along said primary axis in said second hitch receiver wall, said engagement terminus drivable along said second axis through said second aperture toward said threaded fastener to force said insert against an inner surface of said second hitch receiver wall in response to further engagement of said threaded fastener with said threaded portion and an outer surface of said second hitch receiver wall.

3. A hitch assembly comprising:

a hitch receiver having a pair of opposed first apertures through a pair of hitch receiver wall portions, and a second aperture in at least one of said pair of hitch receiver wall portions, said first aperture of a different size than said second aperture; and a pin having a relatively longer primary segment having a threaded portion, said primary segment defining a primary axis, said primary segment passable through one of said first apertures in one of said hitch receiver wall portions, a corresponding insert aperture of an insert telescopically insertable within said hitch receiver, and through said opposed hitch receiver wall portion, said pin having a relatively shorter engagement terminus defining a second axis substantially parallel to said primary axis and perpendicular to the insert such that said engagement terminus is passable through said second aperture to contact the insert; and a threaded fastener receivable upon said threaded portion adjacent to said hitch receiver wall, said engagement terminus drivable along said second axis toward said threaded fastener to force said insert against an inner surface of said hitch receiver wall in response to further engagement of said threaded fastener with said threaded portion and an outer surface of said hitch receiver wall.

4. The hitch assembly as recited in claim 3, wherein said pin is substantially hook shaped.

5. The hitch assembly as recited in claim 3, wherein said engagement terminus is removably attached to said primary segment.

6. The hitch assembly as recited in claim 3, further comprising a secondary retainer engageable with said pin adjacent said threaded portion.

7. The hitch assembly as recited in claim 6, wherein said secondary retainer is a clip.

8. The hitch assembly as recited in claim 6, wherein said secondary retainer is a lock.

9. The hitch assembly as recited in claim 8, wherein said lock engages a frustro-conical end of said pin.

10. The hitch assembly as recited in claim 6, wherein said secondary retainer includes a key activated lock.

11. The hitch assembly as recited in claim 10, further comprising a distal end adjacent said threaded portion of said primary segment to receive said secondary retainer.

12. The hitch assembly as recited in claim 3, further comprising a support arm extending from said primary segment.

13. A hitch assembly comprising:

a hitch receiver having a first aperture through a first and a second hitch receiver wall and a second aperture in said first hitch receiver wall, said first aperture of a different size than said secondary aperture;

an insert for telescopic insertion within said hitch receiver, said insert having an insert aperture which corresponds with said first aperture; and a substantially J-shaped pin having a relatively longer primary segment having a threaded portion, and a relatively shorter engagement terminus, said primary segment defining a substantially horizontal primary axis substantially perpendicular to said insert, said primary segment passable through said first aperture in said first hitch receiver wall, through said insert aperture, and through said second hitch receiver wall such that said threaded portion extends at least partially through said second wall;

said engagement terminus defining a secondary axis displaced from said primary axis such that said engagement terminus is passable through said second aperture to contact said insert;

a threaded fastener receivable upon said threaded portion adjacent to said second hitch receiver wall, said engagement terminus drivable along said second axis toward said threaded fastener to force said insert against an inner surface of said second hitch receiver wall in response to further engagement of said threaded fastener with said threaded portion and an outer surface of said second hitcher receiver wall; and a secondary retainer engageable with a distal end of said threaded portion of said primary segment to prevent removal of said threaded fastener.

14. The hitch assembly as recited in claim 13, further comprising a lock engageable with a frustro-conical end of said threaded portion.

15. The hitch assembly as recited in claim 13, further comprising a lock engageable with a frustro-conical end of said threaded portion.

16. A hitch pin assembly comprising:

a substantially J-shaped pin having a relatively longer primary segment and having a threaded end segment, said primary segment defining a primary axis and an engagement terminus defining a secondary axis laterally displaced from said primary axis, said engagement terminus including an end segment of a smaller diameter than said primary segment;

a threaded fastener receivable upon said threaded end segment; and a lock receivable upon a frustro-conical distal end of said primary segment separate from said threaded end segment to prevent removal of said threaded fastener; said primary segment passes through a pair of axially aligned apertures in a first receiver wall and an opposed second receiver wall, said engagement terminus driven through an aperture in a first hitch receiver wall adjacent said axially aligned apertures to force an insert against an inner surface of said second hitch receiver wall in response to engagement of said threaded fastener with said threaded end segment and an outer surface of said second receiver wall.

17. The hitch pin assembly as recited in claim 16, wherein said threaded end segment of said primary segment includes a through bore to receive a secondary fastener.

18. The hitch pin assembly as recited in claim 16, wherein said lock includes a key activated lock.

19. A hitch assembly comprising:

a hitch receiver having a first aperture and a second aperture; and a pin having a primary segment defining a primary axis, said primary segment passable through said first aperture and a corresponding insert aperture of an insert telescopically insertable within said hitch receiver, said pin having a double engagement terminus defining a secondary axis and a tertiary axis displaced from said primary axis such that a segment of said double engagement terminus is passable through said second aperture to force said insert against an inner surface of a hitch receiver wall in response to engagement of a threaded fastener with a threaded portion of said primary segment and an outer surface of said hitch receiver wall.

20. The hitch assembly as recited in claim 19, wherein said hitch receiver includes a third aperture corresponding to said tertiary axis such that a segment of said double engagement terminus is passable through said third aperture to contact the insert.

21. The hitch pin assembly as recited in claim 19, further comprising a support arm defined along a third axis to contact an external surface of said hitch receiver.

* * * * *